(12) United States Patent
Skov et al.

(10) Patent No.: US 6,695,418 B2
(45) Date of Patent: Feb. 24, 2004

(54) MODULAR SHELVING WITH CABINET

(75) Inventors: Erik L. Skov, Akron, OH (US); David A. Houk, Jr., Norton, OH (US)

(73) Assignee: Rubbermaid Inc., Wooster, OH (US)

( * ) Notice: Subject to any disclaimer, the term of this patent is extended or adjusted under 35 U.S.C. 154(b) by 0 days.

(21) Appl. No.: 10/041,285

(22) Filed: Jan. 8, 2002

(65) Prior Publication Data

US 2002/0171332 A1 Nov. 21, 2002

Related U.S. Application Data

(60) Provisional application No. 60/291,903, filed on May 18, 2001, and provisional application No. 60/261,276, filed on May 16, 2001.

(51) Int. Cl.[7] .............................................. A47B 87/00
(52) U.S. Cl. ..................... 312/107; 108/147.13; 16/253
(58) Field of Search ........................... 312/265.1–265.4, 312/111, 107; 108/107, 186, 147.13, 147.17; 403/155, 109.1, 109.8; 211/188, 133.1; 16/253

(56) References Cited

U.S. PATENT DOCUMENTS

| | | | | |
|---|---|---|---|---|
| 1,313,411 A | * | 8/1919 | Myers | 16/253 |
| 3,516,111 A | * | 6/1970 | Heyman | 16/2.1 |
| 3,765,343 A | * | 10/1973 | Ettlinger et al. | 108/106 |
| 4,128,064 A | * | 12/1978 | Chung et al. | 108/192 |
| 4,635,563 A | * | 1/1987 | Hand et al. | 108/107 |
| 4,856,220 A | * | 8/1989 | Oak et al. | 43/21.2 |
| 5,183,167 A | * | 2/1993 | Cheng | 211/187 |
| 6,099,092 A | | 8/2000 | Uffner et al. | |
| 6,261,026 B1 | * | 7/2001 | Conley et al. | 403/397 |

* cited by examiner

*Primary Examiner*—Norie Chan
(74) *Attorney, Agent, or Firm*—Marshall, Gerstein & Borun LLP

(57) ABSTRACT

Modular shelving with at least one cabinet that includes a plurality of shelves and vertical risers which serve to space the shelves and support loads placed thereon. Cabinet side wall, back wall and door panels are installed about the risers, with each component having a pair of spaced apart holes adapted to slide over the risers. The holes preferably have a diameter just slightly less than the smallest diameter portion of the risers over which the panels will be placed, and are surrounded by one or more radial slots which allow the material around the hole to flex and accommodate larger diameter portions of the risers with an interference fit. The interference fit eliminates the need for precise hole size manufacturing and provides an additional advantage of holding the cabinet doors in a position selected by the consumer.

21 Claims, 4 Drawing Sheets

MODULAR SHELVING WITH CABINET

BACKGROUND OF THE INVENTION

1. Field of the Invention

The present invention relates generally to the field of modular shelving, and in its preferred embodiment to plastic injection and blow molding shelving which includes at least one cabinet having at least one door with an interference fit coupling system.

2. Description of the Related Art

Many different types of shelving systems are known in the art, including modular metal and plastic systems which can be shipped and sold in compact packaging and erected by the consumer. For example, metal shelving units are sold that include a plurality of metal shelves and four metal corner pieces. The corners of the metal shelves are attached to the corner pieces by a bolt and nut assembly. This type of assembly requires a large number of individual pieces and specialized tools for assembly.

Other modular shelving and cabinetry is sold for organizing mail, tools, entertainment pieces, and other similar articles. This type of modular shelving and cabinetry is typically constructed from wood and/or metal in specific dimensions. Separate pieces of the modular shelving and/or cabinetry are designed to be mounted together by hardware which require screws, latches and/or bolts. Again, this type of modular shelving requires a large number of pieces. Additionally, this type of modular shelving and cabinetry is often expensive due to materials used for construction and purpose.

It is also known that such modular shelving can include one or more cabinets. Some systems include numerous drawers within the cabinet units. Others simply place a cabinet on a shelf, while yet others build the cabinet into the unit. For the latter, prior systems have required numerous component parts, resulting in higher manufacturing costs and more difficult assembly. Another disadvantage of many modular shelving and cabinetry is the lack of stability and balance. This problem is exacerbated when items are placed on or within the shelves and/or cabinetry off-center.

Accordingly, it is an objective of the modular shelving with cabinet of the present invention to provide shelving that is strong and balanced when properly erected. Another objective of the modular shelving with cabinet of the present invention is that it should be easy to assemble by having as few different parts as possible. A related objective of the modular shelving with cabinet is that it should not require specialized tools for assembly.

Yet another objective of the modular shelving with cabinet of the present invention is that it should be inexpensive to manufacture. The modular shelving with cabinet of the present invention should also eliminate the need for various components relating to the left or right side of the shelving unit. Finally, an objective of the modular shelving with cabinet is to achieve all of the aforesaid advantages and objectives without incurring any substantial relative disadvantage.

Modular shelving with cabinet that demonstrates the objectives and advantages as discussed above would represent a significant advance in this art.

SUMMARY OF THE INVENTION

The present invention overcomes the above noted disadvantages of the related art by providing a modular shelving with cabinet(s) that reduces manufacturing cost, reduces part count, and improves performance and ease of assembly. The present invention also eliminates the need for different components for the left and right side of the cabinet.

A further feature of the present invention is to provide modular shelving with cabinet(s) that requires less precise manufacturing tolerances than prior systems. This is accomplished by a coupling system used by the modular shelving with cabinet of the present invention.

A different feature of the present invention is to provide modular shelving with cabinet(s) in which each door is coupled to a vertical, tubular riser by an interference fit which inhibits unwanted door movement following assembly.

How these and other features of the invention are accomplished, individually, in combination or in various subcombinations will be described in the following detailed description of the preferred embodiment, taken in conjunction with the attached FIGURES. Generally, however, they are accomplished in a modular cabinet system including at least one shelf having sockets at its corners and vertically positioned risers coupled to the sockets to space the shelves apart. In the preferred embodiment, the risers are tapered and nest within one another to permit stacking multiple cabinets when erecting the modular shelving with cabinet. Each cabinet in the system preferably includes two side wall panels, a rear wall panel and at least one door panel, each being coupled to the risers by having the risers pass through hollow sections of the panels and through upper and lower holes therein. The holes have a diameter equal to or just slightly less than the smallest diameter of that portion of a riser located between two shelves, and one or more radial slots is provided in the material surrounding the holes to allow the material to flex and accommodate larger diameter portions of the riser to provide an interference fit.

The coupling system used to couple the panels with the risers is made by providing shelving material and providing a hole that extends through a portion of the shelving material. As mentioned above, the hole has at least one slot extending radially outward from the hole. The hole may be provided by methods known in the art including cutting the shelves material, or by blow molding the shelving material to include a raised portion on the surface of the shelving material, which may be subsequently removed, by cutting or the like, to expose the hole.

Other ways in which the features of the invention are accomplished will become apparent to those skilled in the art after they have read the specification, and such other ways are deemed to fall within the scope of the present invention if they fall within the scope of the claims which follow.

DETAILED DESCRIPTION OF THE PREFERRED EMBODIMENT

Before beginning the detailed description of the preferred embodiment, several general comments can be made about the applicability and the scope of the present invention.

First, while a modular shelving with cabinet is shown which includes tubular risers, the risers need not be tubular to take advantage of the present invention. For example, the risers may have a rectangular, polygonal, triangular or circular cross-section, and the cross-section may be substantially uniform or may alternate between geometric designs as known in the art.

Second, a modular shelving with cabinet is shown with at least two doors. However, the modular shelving with cabinet of the present invention may have only one door to take advantage of the present invention.

Third, blow molded panels are preferred for use in the modular shelving with cabinet, including side, back and door panels. However, other molding techniques can be used as long as they provide a thickness suitable for receiving a riser therethrough.

Fourth, while polyethylene is the preferred material for the blow molded panels, other plastics and deformable materials may be employed.

Fifth, risers employed in the present invention may have a taper of approximately $1/16^{th}$ of an inch to $1/4^{th}$ of an inch between adjacent shelf sockets. However, the amount of taper, or whether a taper exists at all, can be varied by one skilled in the art after they appreciate the present invention.

Sixth, while the preferred and illustrated embodiment shows a coupling system with a hole having four slots extending radially therefrom, the number of slots can be as few as two and can be a greater number, e.g., eight or more. Furthermore, the length of the slot can widely vary, being determined primarily by product geometry. Preferably, the slot should be about $1/8^{th}$ of an inch or greater, and in the preferred embodiment is closer to ½ of an inch for each slot.

Lastly, the illustrations show that side panels of the modular shelving with cabinet do not extend over the edges of the shelves but extend between them. On the other hand, the door panels are constructed and arranged to have flanges at their upper and lower surfaces which cover the front edges of the shelves. The modular shelving with cabinet may be altered by having the side panels also constructed to conceal the shelving edges and/or the door panels may be constructed to fit within the space defined by the shelves.

Figure 1:
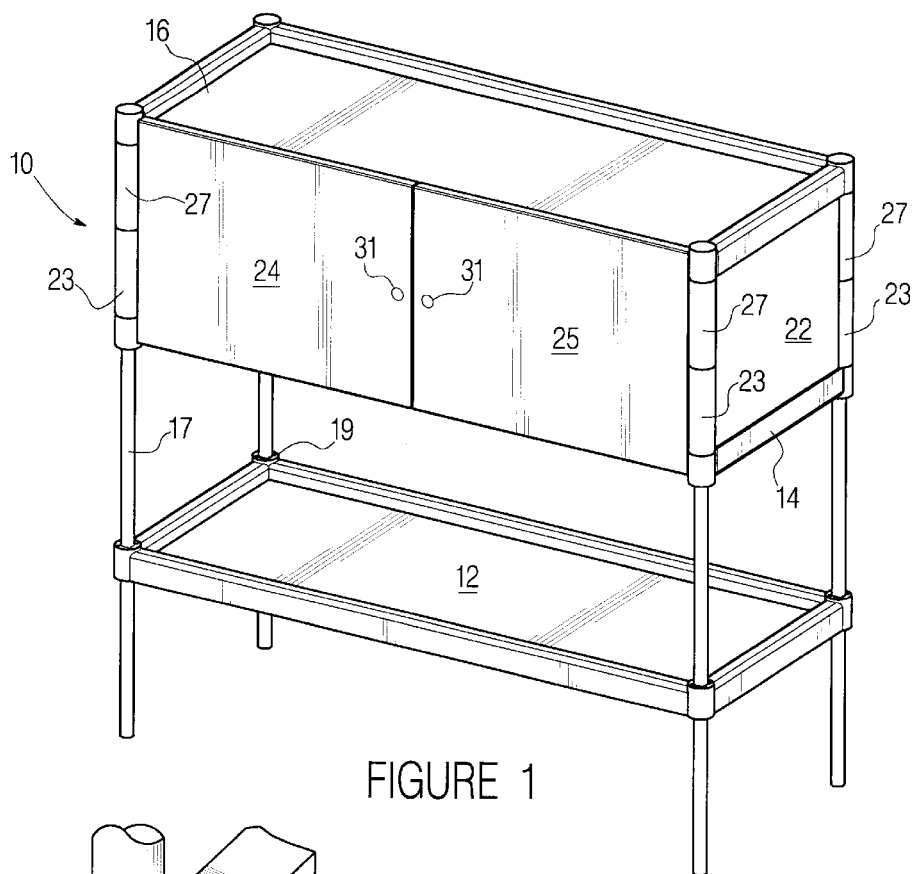
FIG. 1 is a perspective view of a portion of a modular shelving with cabinet including a cabinet having two door panels.

Proceeding now to a description of FIG. 1, a modular shelving with cabinet 10 is shown, and includes a first shelf 12, a second shelf 14 and an upper shelf 16. More shelves can be employed and additional cabinet systems can be stacked upon one another as will be later shown and described. Risers 17 are located at each corner of the shelves 12, 14, and 16 and serve to space the shelves apart from one another and to support loads placed thereon. The risers 17 also serve to raise the shelves 12, 14, and 16 off the ground. In the preferred embodiment, the risers 17 are arranged so that they taper from the top to the bottom so that they are capable of being nested with respect to adjacent risers. For example, the riser designated by reference numeral 17 in FIG. 1 can have its lower end nest in the upper end of a riser situated below it, while the upper end may receive the lower end of a different riser.

The risers 17 extend through each shelf 12, 14, and 16 at sockets 19. Sockets 19 are located at the corner of each shelf and serve to receive the upper and lower ends of the risers 17. The socket geometry can be any known to this art, including without limitation substantially circular, rectangular, polygonal, or triangular geometry. However, in the preferred embodiment, the sockets 19 are substantially circular. In other embodiments, the sockets 19 may also be formed to permit the risers 17 to be plugged into the sockets 19 to support the shelves 12, 14, and 16.

The cabinet components of the present invention include side panels 22 (only the left one of which is shown), a rear panel (which is not visible in this view) and a pair of door panels 24 and 25. In the preferred embodiment, each of these panels are blow molded and are therefore at least partially hollow with a thickness at the panel edges adjacent to the risers greater than the riser thickness. The panels each fit over the risers 17 to assemble the shelving unit 10 and form the cabinet between shelves 14 and 16.

In the illustrations, side panels 22 have extensions 23 at their front and rear edges, the extensions 23 being approximately one-half the height of the panel. The extensions 23 fit over risers 17 and rest upon shelf 14. The panels are held in place, in part, by a coupling system to be described in greater detail in connection with FIGS. 2 and 3. The door panels 24 and 25 also include extensions 27 at one of its side edges, which are capable of extending over the risers 17. The door extensions 27 are located at the top of the space between two adjoining shelves 12 and 14. Accordingly, extensions 27 will rest upon extensions 23 as is illustrated in FIG. 1. Similar extensions 27 extend from the rear panel (which is otherwise not shown) for coupling the rear panel to the risers 17 and to the overall shelving assembly 10. Although the extension location is described herein, it will be apparent that other embodiments of the present invention may have side panels with extensions located at the upper half of the panel and door and rear panels with extensions at the lower half of the panels.

The side 22 and rear panels are coupled to two different risers 17 at extensions 23 and 27, respectively, so that the side 22 and rear panels are fixed into position and may not pivot about the axis of any one riser. Conversely, doors 24 and 25 are coupled to only one riser by extension 27, and each may pivot about the axis of a riser 17 so that it may be opened and closed. Each of the doors may also include a knob or pull 31 that may be selected by any cabinet hardware known in the art or may be integrally molded within the doors.

Figure 2:
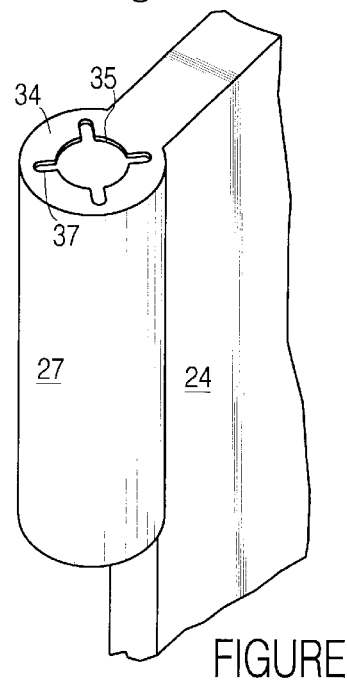
FIG. 2 is a partial perspective view of a portion of one of the door panels illustrated in FIG. 1 showing a coupling system in accordance with the teachings of the present invention.

The coupling system of the present invention can best be appreciated by reference now to FIG. 2, which shows the extension 27 and a portion of door 24. The top of extension 27 is a planar surface 34, and a hole 35 is provided therein. The hole 35 passes through the extension 27 to the bottom surface of the extension 27 (which is not visible in this view). Extending radially from hole 35 are one or more slots 37, four of which are illustrated in the preferred embodiment. From this FIGURE, it will be evident that the area between the slots 37 will have the ability to flex upwardly or downwardly with respect to the surface 34, and provide an interference fit when used in combination with a riser 17.

The hole 35 may be formed by methods known in the art, including providing a raised surface during the blow-mold process, which is subsequently removed by cutting or the like to expose the hole 35 that extends through extension 27. Another method of forming the hole 35 would be to cut the hole 35 within the top surface 34 and bottom surface of extension 27.

The size of the hole 35 is selected for particular applications, but in the most preferred embodiment, it is just slightly smaller than the smallest portion of the riser that will be encountered during assembly of the component. This will provide an amount of interference at the lower end of the extension and a slightly greater amount of interference at an upper portion of the same riser, due to the taper of the riser and the fact that the holes 35 are of the same size. Preferably, the hole 35 is no larger than the smallest diameter or cross-sectional area of the riser 17 to be encountered to prevent misalignment or sagging of the various components. The invention also contemplates holes other than round holes. For example, if square risers are used, the holes would be square and the slots could extend from the corners or the sides of the holes, or both.

Figure 3:
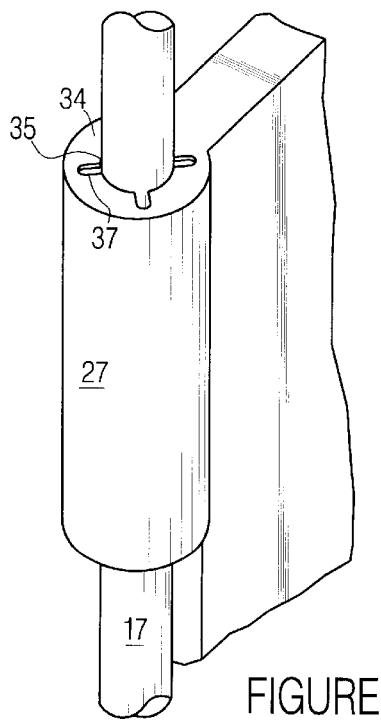
FIG. 3 is a schematic illustration of a portion of a riser and a portion of the door panel illustrated in FIGS. 1 and 2.

FIG. 3 illustrates a riser 17 extending upwardly through the hole 35 of extension 27. The portions of the top surface 34 between slots 37 flexes to fit around riser 17, while simultaneously applying pressure against riser 17 to hold the panel in place. The bottom surface of extension 27 is not visible in this FIGURE, but would also provide an interference fit around riser 17 through use of a hole with one or more slots.

Referring to FIGS. 4–7, a cabinet 40 according to an exemplary embodiment includes a plurality of shelves 42 supported by a plurality of risers 44, a bottom 46 (which may also function as a shelf), and a top 48 (which may also serve as a shelf). Risers 44 engage sockets 50 at corners of shelves 42, bottom 46, and top 48. According to a preferred embodiment, four risers 44 are used for each cabinet component 70 and are tubular.

Cabinet 40 also includes a plurality of side panels 52, a plurality of rear panels 54, and a plurality of door panels 56. Side panels 52 and rear panels 54 include a pair of extensions 58, 60 respectively. Each door panel 56 also includes a extension 62. Extensions 58, 60, 62 are configured to receive risers 44 to couple each panel (side, rear, and door) to al least one riser 44.

According to an exemplary embodiment, extensions 58, 60, 62 are configured and positioned on the panels to provide modularity and interchangeability. For example, as shown in FIGS. 4–7, extensions 58 on side panels 52 are disposed on a lower portion of the panel; extensions 60 on rear panels 54 are disposed on an upper portion of the panel; and extension 62 on door panel 56 are disposed on an upper portion of the panel. Alternatively, the extensions may be disposed on the other of the upper and lower portion. Alternatively, the extensions may alternate between the upper and lower portion on a single panel.

Figure 4:
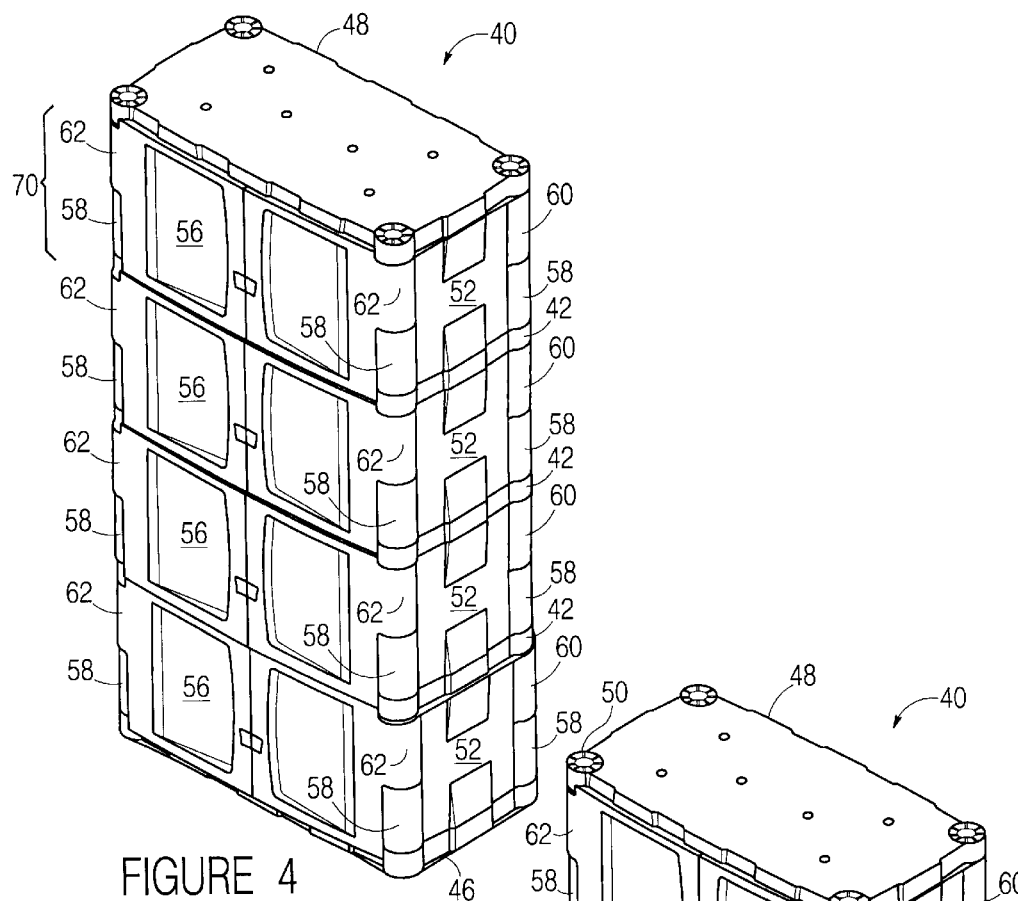
FIG. 4 is a perspective view of modular shelving with cabinet in accordance with the teachings of the present invention.
Figure 6:
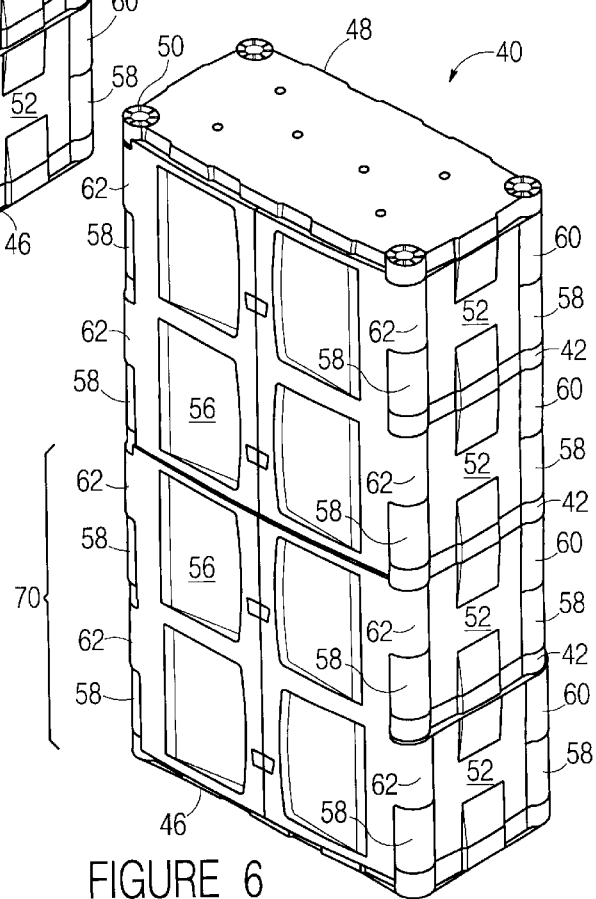
FIG. 6 is a perspective view of an alternate embodiment of modular shelving with cabinet in accordance with the teachings of the present invention.
Figure 5:
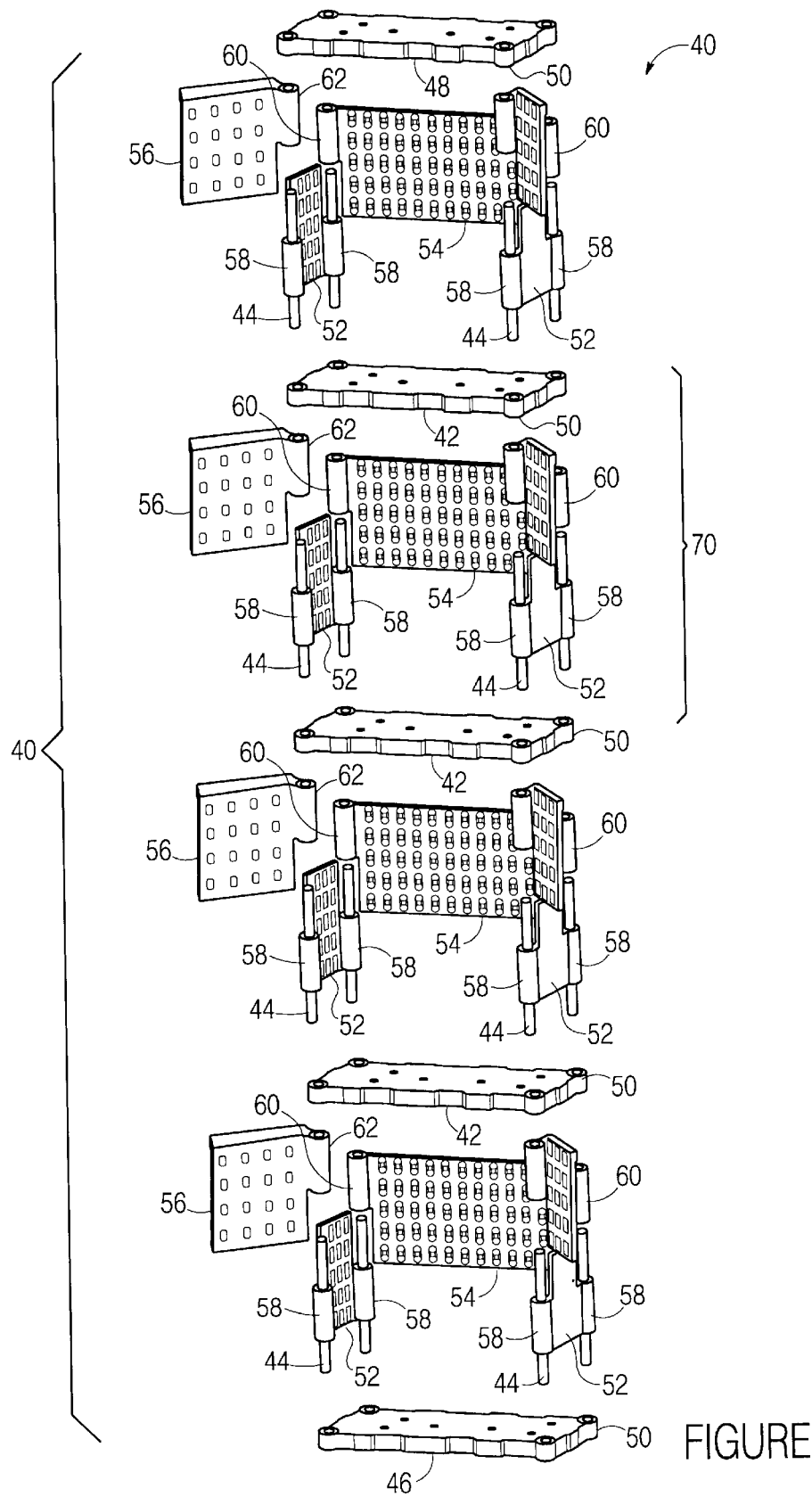
FIG. 5 is an exploded view of the modular shelving with cabinet illustrated in FIG. 4.
Figure 7:
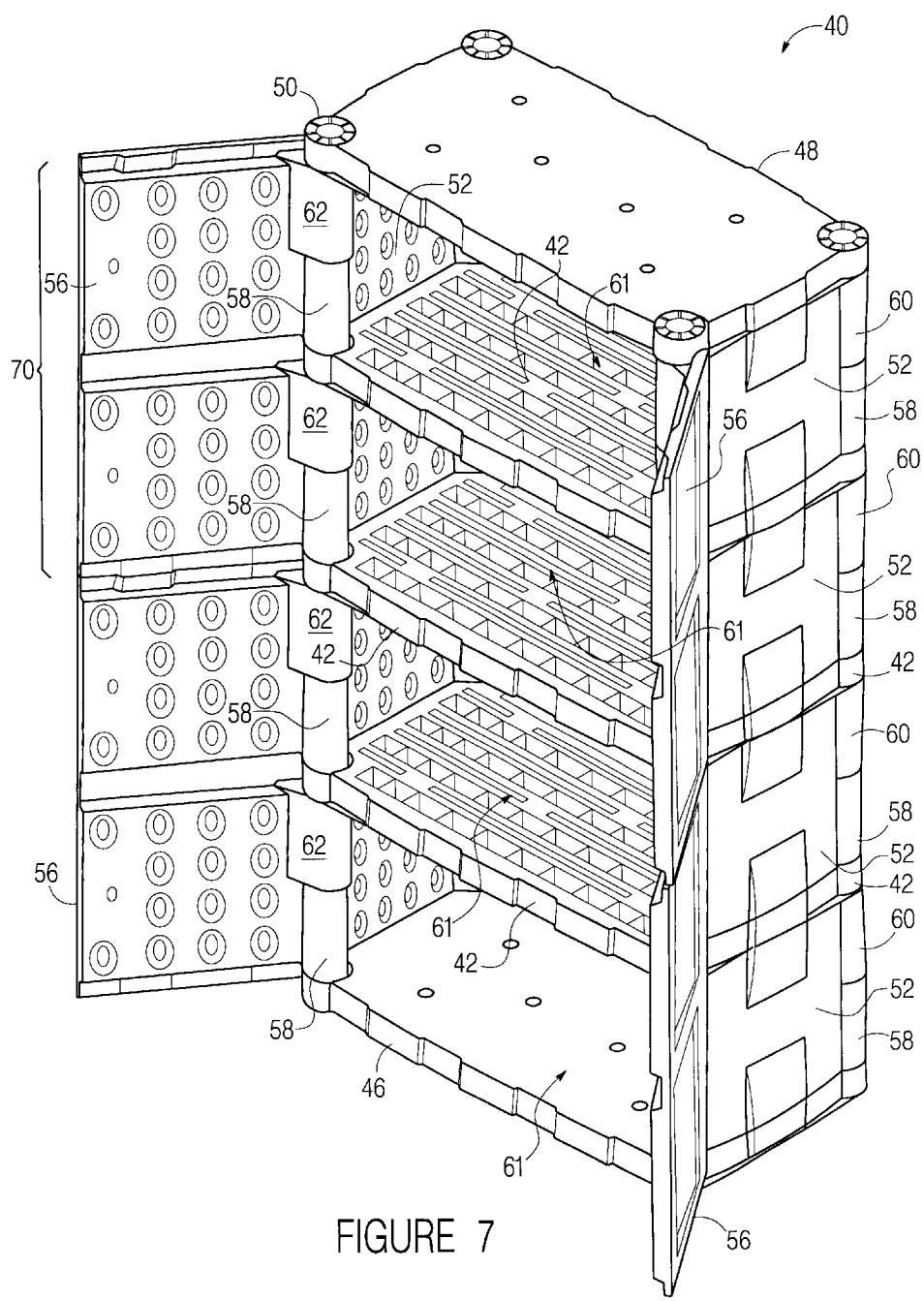
FIG. 7 is an alternate perspective view of the modular shelving with cabinet illustrated in FIG. 6 showing doors panels in an open position.

According to an exemplary embodiment shown in FIGS. 4 and 5, door panels 56 cover (at least partially) one shelving space 61. According to an alternative embodiment shown in FIGS. 6 and 7, door panel 56 is configured to cover a pair of shelving spaces 61, in which case the door panel 56 may include a pair of extensions 62 that engage risers 44. Alternatively, the door panels may cover any number of shelving spaces (e.g., three shelves, all of the shelves, the entire front of the cabinet, etc.).

While the present invention has been described in connection with a single preferred embodiment, the invention can be variously embodied as indicated above and in other ways which become apparent to those skilled in the art after they have read this specification. Accordingly, the scope of the invention is not to be limited by reference to any particular materials, descriptions or illustrations, but is to be limited solely by the scope of the claims which will be provided for this application.

What is claimed is:

1. A modular shelving system comprising:
   at least a first cabinet assembly including a plurality of risers and a plurality of generally vertically oriented panels interconnected at a plurality of corners to define an interior space;
   at least one first panel extension extending from a portion of a first one of said vertically oriented panels, and at least one second panel extension extending from a portion of a second one of said vertically oriented panels, wherein the second pane is adjacent to the first panel, each extension including a top surface, a bottom surface, and a through hole extending from the top surface to the bottom surface, wherein the hole of the first panel and the hole of the adjacent, second panel are concentrically aligned and the first and second panel extensions are in contact at one of the plurality of corners;
   wherein one of the plurality of risers is received in the concentrically aligned holes of the first and second extensions to form one of the plurality of corners, and wherein each of the first panel extension and second panel extension has a height that is approximately one-half the panel height of a respective one of the first and second panels.

2. The modular shelving system of claim 1, wherein the plurality of generally vertically oriented panels includes at least two side wall panels including a front edge and a rear edge, at least one rear wall panel including a left edge and a right edge, and at least one door panel.

3. The modular shelving system of claim 2, wherein the first panel extension is disposed at the rear edge and the second panel extension is disposed at front and rear edges.

4. The modular shelving system of claim 1, wherein the top and bottom surfaces of each extension include slots extending radially from the hole.

5. The modular shelving system of claim 1, wherein the diameter of the hole is slightly less than the smallest diameter of the riser.

6. The modular shelving system of claim 1, further comprising at least one door panel.

7. The modular shelving system of claim 1, further comprising at least one shelf.

8. The modular shelving system of claim 1, further comprising a top panel and a bottom panel.

9. The modular shelving system of claim 8, wherein the top panel and the bottom panel include sockets for coupling to one of the plurality of risers at one of the plurality of corners.

10. The modular shelving system of claim 1, wherein the first panel extension extends from an edge of the first panel.

11. The modular shelving system of claim 1, wherein the second panel extension extends from an edge of the second panel.

12. The modular shelving system of claim 1, wherein the risers are tubular shaped.

13. The modular shelving system of claim 12, wherein the risers are tapered.

14. The modular shelving system of claim 1, wherein the panels are fabricated from blow molded plastic.

15. The modular shelving system of claim 1, further comprising one or more additional vertically adjacent cabinet assemblies which are vertically stacked with the first cabinet assembly, each additional vertically adjacent cabinet assembly having a plurality of corners corresponding positionally to the plurality of corners of the first cabinet assembly.

16. The modular shelving assembly of claim 15, further comprising a shelf separating each vertically adjacent cabinet assembly, each shelf having a socket for coupling to one of the plurality of risers at one of the plurality of corners.

17. The modular shelving assembly of claim 15, wherein each cabinet assembly includes at least one door panel.

18. The modular shelving assembly of claim 15, further comprising a door panel having a height of at least two vertically adjacent cabinet assemblies.

19. The modular shelving assembly of claim 1, further comprising a pair of side panels and a pair of door panels, each door panel having a door panel extension extending from a portion thereof.

20. The modular shelving assembly of claim 19, wherein the door panel extension is pivotally coupled to one of the plurality of risers.

21. The modular shelving assembly of claim 19, wherein the first panel extension is disposed at a front edge of one of the side panels and the second panel extension is the door panel extension.

* * * * *

UNITED STATES PATENT AND TRADEMARK OFFICE
CERTIFICATE OF CORRECTION

PATENT NO. : 6,695,418 B2
DATED : February 24, 2004
INVENTOR(S) : Erik L. Skov et al.

It is certified that error appears in the above-identified patent and that said Letters Patent is hereby corrected as shown below:

Column 6,
Line 20, please delete "pane" and replace with -- panel --.

Signed and Sealed this

Fifteenth Day of February, 2005

JON W. DUDAS
*Director of the United States Patent and Trademark Office*